UNITED STATES PATENT OFFICE.

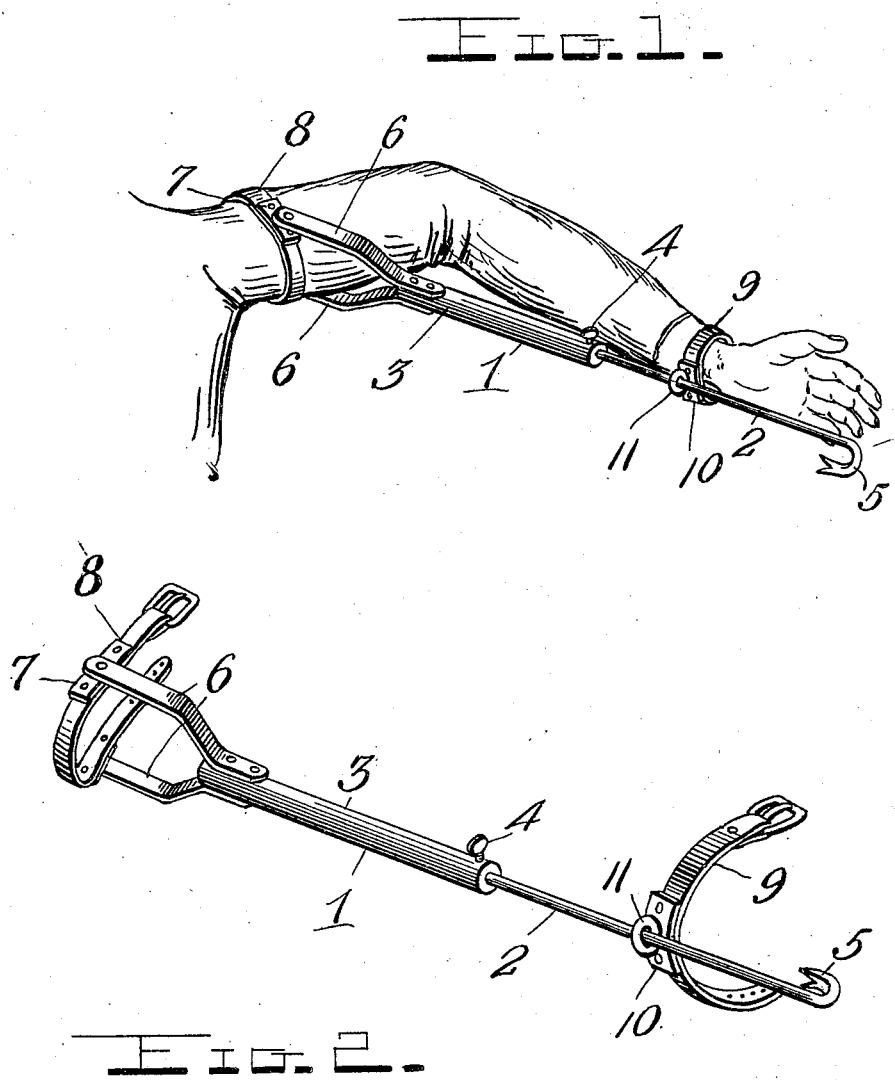

DONALD B. STONE, OF SPRINGVILLE, IOWA.

HUSKING DEVICE.

No. 929,173.  Specification of Letters Patent.  Patented July 27, 1909.

Application filed April 29, 1909. Serial No. 492,951.

*To all whom it may concern:*

Be it known that I, DONALD B. STONE, a citizen of the United States, residing at Springville, in the county of Linn and State of Iowa, have invented certain new and useful Improvements in Husking Devices; and I do declare the following to be a full, clear, and exact description of the invention, such as will enable others skilled in the art to which it appertains to make and use the same.

This invention relates to improvements in corn husking devices.

The object of the invention is to provide a corn husking device adapted to be secured to the left arm of the operator to facilitate the removal of the husks from the ears of corn while on the stalks, thus enabling the operator to twist the husked ears from the stalks and throw the same into the wagon or receptacle with his right hand.

With the foregoing and other objects in view, the invention consists of certain novel features of construction, combination and arrangement of parts, as will be more fully described and particularly pointed out in the appended claims.

In the accompanying drawings, Figure 1 is a perspective view of the device, showing the manner in which the same is applied to the arm and operated; Fig. 2 is a perspective view of the device detached from the arm.

Referring more particularly to the drawings, 1 denotes the husking device which consists of an outer rod or member 2 and an inner tubular member 3, with which the inner end of the outer rod or member 2 is telescopically engaged and in which said outer member is adjustably secured by means of a set screw 4. On the outer end of the outer rod or member 2, is formed a husking hook 5.

On the inner end of the tubular inner member of the device is secured forked arms 6, to the outer ends of which are pivotally connected strap attaching plates 7 to which is riveted or otherwise secured an arm engaging strap 8 adapted to be buckled around the upper arm of the operator, as shown in Fig. 1 of the drawings. The outer portion of the rod 2 of the device is held in operative position and slidably connected with the wrist of the operator by means of a wrist engaging strap 9 having riveted thereto a plate 10 on which is secured a guide eye 11 through which the rod 2 projects and slides.

In the operation of this device, the same is adapted to be secured to the left arm and wrist of the operator, in the manner shown in Fig. 1 of the drawings, and when thus arranged the husking operation is entirely performed by the left hand assisted by the husking hook 5 so that, after the husks have been disengaged from the ear, the latter can be grasped by the right hand and twisted from the stalk and thrown into a wagon or receptacle provided therefor, thus greatly facilitating the husking and gathering of the corn.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim is:

1. In a corn husking device, an operating rod, a husking hook on the outer end of said rod, an arm attaching strap secured to the inner end thereof, a holding plate, a guide loop on said plate to receive the hooked end of the operating rod, and a wrist engaging strap secured to said plate whereby the latter is attached in operative position to the wrist.

2. In a husking device of the character described, an operating rod comprising a tubular inner member, an outer rod or member telescopically engaged with said tubular inner member, a set screw to hold said rod in its adjusted position in said inner member, an attaching fork on the end of said inner member, an arm engaging strap pivotally connected with said forked end, whereby the latter is detachably secured to the arm, a holding plate, a guide loop on said plate to receive the hooked end of the outer member of the operating rod, and a wrist engaging strap secured to said plate whereby the latter is attached in operative position to the wrist.

In testimony whereof I have hereunto set my hand in presence of two subscribing witnesses.

DONALD B. STONE.

Witnesses:
I. H. CREW,
E. B. CLINE.